United States Patent [19]

Benn

[11] Patent Number: 5,039,264
[45] Date of Patent: Aug. 13, 1991

[54] SCRATCH RESISTANT CLIP-ON NUT

[75] Inventor: Howard M. Benn, Santa Monica, Calif.

[73] Assignee: The Monadnock Company, City of Industry, Calif.

[21] Appl. No.: 278,344

[22] Filed: Dec. 1, 1988

[51] Int. Cl.⁵ .............................................. F16B 37/02
[52] U.S. Cl. ..................................... 411/175; 411/112; 411/523; 411/970
[58] Field of Search ........ 411/108, 111, 112, 172–175, 411/182, 522–524, 970, 522, 523, 524, 965

[56] References Cited

U.S. PATENT DOCUMENTS

| 2,062,685 | 12/1936 | Tinnerman | 411/174 |
| 2,255,469 | 9/1941 | Kost | 411/970 X |
| 2,378,257 | 6/1945 | Tinnerman | 411/970 X |
| 2,390,750 | 12/1945 | Tinnerman | 411/970 X |
| 2,394,729 | 2/1946 | Tinnerman | 411/112 |
| 2,399,958 | 5/1946 | Tinnerman | 411/172 X |
| 2,400,270 | 5/1946 | Tinnerman | 411/172 X |
| 2,672,905 | 3/1954 | Hartman et al. | 411/175 |
| 2,861,618 | 11/1958 | Tinnerman | 411/970 X |
| 3,358,729 | 12/1967 | Munse | 411/175 |
| 3,376,612 | 4/1968 | Munse | 411/523 |
| 3,414,035 | 12/1968 | Munse | 411/175 |
| 3,426,818 | 2/1969 | Derby | 411/175 |
| 3,927,707 | 12/1975 | Wright | 411/174 |
| 4,074,491 | 2/1978 | Bell et al. | 411/116 X |
| 4,729,706 | 3/1988 | Peterson et al. | 411/523 X |

FOREIGN PATENT DOCUMENTS

| 2232385 | 1/1974 | Fed. Rep. of Germany | 411/112 |
| 54698 | 6/1943 | Netherlands | 411/522 |
| 2087024 | 5/1982 | United Kingdom | 411/523 |

Primary Examiner—Gary L. Smith
Assistant Examiner—F. Saether
Attorney, Agent, or Firm—Irving Keschner

[57] ABSTRACT

A clip-on nut for enabling a panel to be secured to a support structure, the clip-on nut being secured to the support structure. The clip-on nut has a portion for guiding the clip-on nut into an aperture formed on the support structure, the guide portion comprising a spherically rounded projection.

5 Claims, 1 Drawing Sheet

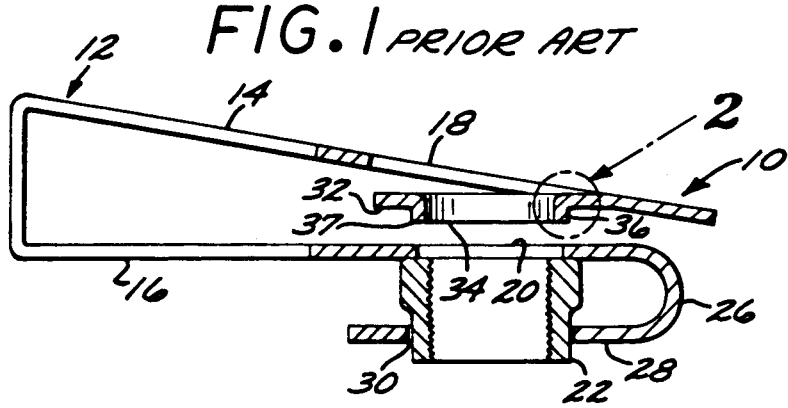
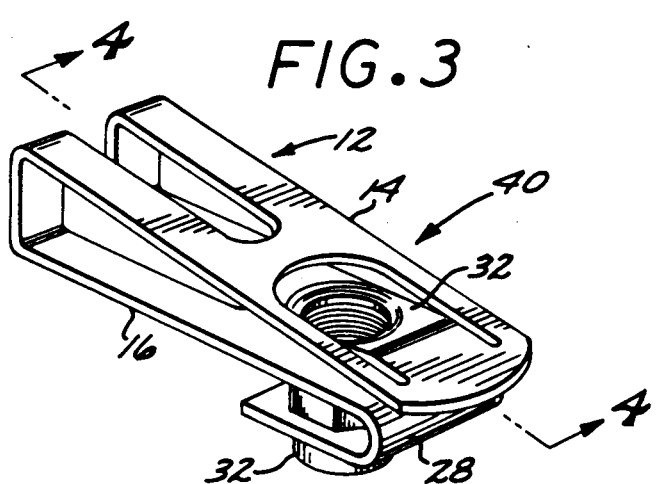
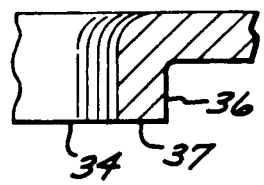
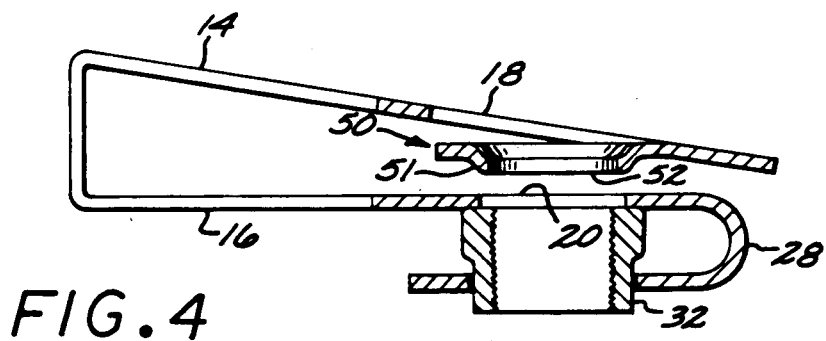
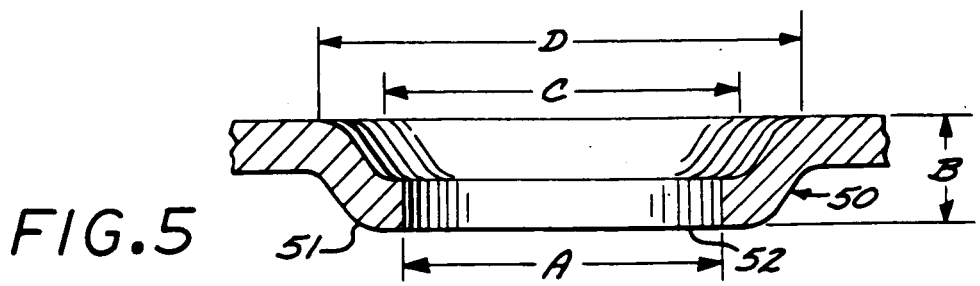

SCRATCH RESISTANT CLIP-ON NUT

BACKGROUND OF THE INVENTION

1. Field of Invention

The present invention relates to clip-on nuts and, in particular, a device for enabling a panel to be coupled to a support structure.

2. Description of Prior Art

The term clip-on nut will be used in this disclosure to refer to the present invention as well as the entire general field. Other terms in use are "C-type fastener"; "U-shaped clip-nut"; "J-fasteners" and the like which describe the general shapes. Clip-on nuts are usually made of spring steel or hardenable steel formed from thin sheets by punching and bending and usually followed by heat treatment. An earlier form of clip-on nut is described in U.S. Pat. No. 2,062,685 to G. A. Tinnerman. In recent years, the field has specialized to include wide range clip-on nuts capable of emplacement on a wide range of panel thicknesses, such as shown in U.S. Pat. No. 3,358,729 to R. A. Munse.

Clip-on nuts usually slide onto the edge of a work panel with a portion on each side of the panel to place a nut element in line with a hole. Sometimes a clip-on nut is attached through a slot in a work panel rather than at an edge.

They are used in any application where access is limited so that manually holding a nut behind the hole is difficult or impossible. They are also used where it is desired to provide self retention of the nut on the work panel without riveting or other expensive means. Common applications are in automobiles, appliances, and aircraft.

Most clip-on nuts are located in a line with a hole by eye or by a piece that extends into the hole such as in U.S. Pat. No. 3,414,035 to R. A. Munse. Rapid emplacement and accurate locating on a work panel are important features of any clip-on nut. Low cost is another important feature.

The clip-on nut disclosed in U.S. Pat. No. 3,927,707 comprises a threaded nut element which has attached to it two arms extending in a plane which is radial to the longitudinal axis of the nut element at pre-determined angles. The arms are bent back upon themselves to form upper and lower opposed portions, the space between them adapted to receive a work panel. Protrusions extend into the space from the lower portion of the arm, and bent guide tabs extending away from the arms to facilitate emplacing the clip-on nut on a work panel are also provided.

U.S. Pat. No. 4,074,491 to Bell et al discloses a clip-on nut, or spring clip, having a resilient material molded to the interior surface thereof. Each of the legs of the U has an aperture and the apertures are aligned for receiving a bolt therethrough. The resilient material is integrally molded into a bushing within each of the apertures, the bushing including a projection of resilient material which, when the clip is slipped onto the support structure having a mating hole, allows the projection on the apertured legs to extend into the opening, thereby forming an interlocking engagement with the hole for retention of the clip.

Another clip-on nut which has been commercially available has a vertically extending cylindrical projection formed on one leg of the U positioned adjacent to and in alignment with an aperture formed in the other leg. The vertically extending portion is used to guide the clip to an aperture formed on a work panel.

Although the clip-on nuts currently available have been used with various degrees of success, a major disadvantage is that they tend to scratch the metallic surface of the work panel which in turn provides a path for corrosion, the structural integrity of the assembled part thus being endangered. Although the resilient projections shown in the Bell patent device ma inhibit scratch formation in the support structure as the clip-on nut is being secured thereto, the necessity of molding a resilient material to the inner surface of the clip-on nut substantially increases the cost of fabrication thereof.

What is thus desired is to provide a clip-on nut designed to minimize scratching of the support structure surface and which is also simple and inexpensive to fabricate.

SUMMARY OF THE PRESENT INVENTION

The present invention provides a clip-on nut designed to minimize the possibility of scratching the surface of the support structure to which it is secured. The clip-on nut has a portion for guiding it into an aperature formed on the support structure, the guide portion comprising a vertically extending diametrical projection, the surface of the projection contacting the support structure having its edge in the shape of a radius.

The clip-on nut of the present invention is relatively inexpensive to fabricate and is designed to be dimensionally compatible with currently used clip-on nuts, thus minimizing the cost of replacing existing clip-on nuts with the device formed in accordance with the teachings of the present invention.

BRIEF DESCRIPTION OF THE DRAWING

For a better understanding of the invention as well as other objects and further features thereof, reference is made to the following description which is to be read in conjunction with the accompanying drawing wherein:

FIG. 1 is a sectional view of a prior art clip-on nut device;

FIG. 2 is a detail of an area of the prior art device shown in FIG. 1;

FIG. 3 is a perspective view of a clip-on nut device constructed in accordance with the teachings of the present invention;

FIG. 4 is a cross-sectional view along line 4—4 of FIG. 3; and

FIG. 5 is an enlarged view of the protrusion formed on the device shown in FIG. 4.

DESCRIPTION OF THE INVENTION

Referring now to FIGS. 1–2, a prior art clip-on nut 10 is illustrated. The clip-on nut 10 comprises a spring steel strip or metal band 12 bent to form an S-shaped clip-on nut. The two laterally extending adjacent legs 14 and 16 of the S-shaped clip-on nut (forming a U-shaped configuration) are provided with apertures 18 and 20, respectively, a self-locking nut 22 being embraced therebetween for receiving a bolt (not shown). As illustrated, leg 16 is shorter than leg 14. Laterally extending leg 16 has a return bent end 26 which forms a third leg 28 of the clip-on nut 10, leg 28 having an aperture 30 formed therein. Apertures 18 and 20 are adapted to be vertically aligned, the captive nut 22 having its threaded opening in alignment with aperture 30 in angled leg 28.

The space or distance between the closest contact point of legs 14 and 16 is approximately equivalent to the thickness of the part or support structure to which the clip is attached, the spreading legs 16 and 30, or the spring action, permitting the clip-on nut 10 to be slipped onto parts of different thicknesses for a more universal utilization thereof.

An horizontally extending tab portion 32 is formed in leg 14, tab portion 32 also incorporating an aligned aperture 34. Surrounding aperture 34 and extending vertically downward therefrom is a cylindrically shaped projection 36.

When properly positioned onto a support structure (not shown), the aperture leg 16 and tab portion 32 have their apertures in registry with those of a frame member (not shown), and when properly aligned in the opening in the frame member, the projection 36 is inserted into the support structure, the outer surface of projection 36 bearing against the inner surface of the aperture in the support structure thus permitting legs 16 and 28 of the clip to be interlocked and retained in position. The spring characteristic of tab portion 32 enables support structures of various thicknesses to be engaged thereby. In addition, projection 36 and rounded edge 37 serve to guide the clip-on nut into registry with the aperture in the support structure. When clip-on nut 10 is positioned on the support structure, a bolt is inserted through the aligned apertures and the assembly is fastened together by captive nut 22.

Although the prior art clip-on nut described hereinabove has been utilized successfully, a disadvantage in its utilization is that edge or area 37 on projection 36 can scratch the metal surface of the structure as it is installed into place since it is the contact point to the structure. In essence, any sharp corners on protrusion 36 will cause scratches. Scratches can lead to corrosion paths which in turn may impact the structural integrity of the assembly.

The clip-on nut 40 of the present invention shown in FIGS. 3–5 is similar to the clip-on nut shown in FIGS. 1–2; therefore those elements which are similar in appearance and function have been given like reference numerals. It should be noted that an optional configuration for both clip-on nuts 10 and 40 is to have the tip of leg 14 extend upwardly at an angle to the longitudinal axis of leg 14. In accordance with the teachings of the present invention, the vertically extending, cylindrical projection 36 of the prior art clip-on nut has been eliminated and replaced with a diametrical projection, or protrusion, 50 with the diameters having a radius as shown in FIG. 5 formed on tab portion 32, an aperture 52 being formed in protrusion 50. As with reference to the prior art clip-on nut 10, aperture 52 is aligned with apertures 18 and 20 and the opening in captive nut 22.

Protrusion 50, as well as the entire clip-on nut 40 (other than nut 22) is fabricated as an integral member from a metal material, preferably 1050 steel having a cadmium plated finish (the nut 22 preferably is fabricated from a carbon or alloy steel and has a cadmium and dry film lubricant finish). The shape and dimensions of protrusion 50 are selected to substantially prevent the metal surface of the support structure from being scratched as the clip-on nut 40 is positioned thereon. In particular, the sharp corners of protrusion 36 in the prior art embodiment have been eliminated and a round, smooth surface 51 has been created by two inversely connecting radial arcs forming essentially an S-shape, thus preventing the surface of the support structure from being scratched. In essence, the surface of protrusion 50 adjacent leg 16 is shaped such that its edge is rounded and in the shape of a radius. In other words, the protrusion is diametrical with the diameter having a radius as shown in FIG. 5. The radius on the protrusion keeps the clip-on nut 40 from scratching the surface of the structure that it is attached to, the protrusion also securing the clip-on nut 40 to the structure once it is installed.

Typical dimensions of protrusion 50 fabricated in accordance with the teachings of the present invention are as follows:

A—(diameter of aperture 52 in protrusion 50)—0.195 inch.
B—(height of protrusion 50)—0.040 inch.
C—(diameter (reference)—0.235 inch.
D—(outside diameter of protrusion 50)—0.260 inch.

The protrusion 50 is formed in a standard press punch operation as part of the formation of the entire clip-on nut 40, other than the captive nut 22 which is formed in a separate operation.

The present invention thus provides an improved clip-on nut which does not scratch the surface of the support structure to which it is secured and which is relatively simple to fabricate in a cost-effective manner.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A clip-on nut for attachment to a support structure comprising:
    a U-shaped metal member having first and second leg members extending laterally from a curved end portion, aperatures being formed in each of said first and second leg members, said aperatures being in alignment; and
    a tab portion connected to the end of said second leg member spaced from said end portion and having a protrusion extending in the direction of said first leg member, said protrusion comprising a vertically extending portion terminating in a circularly shaped end face portion, the entire surface joining the edge of the face portion at its diametrical extent and the adjacent edge of the vertically extending portion having a curved shape defined by two inversely connecting radial arcs forming generally an S-shape, said curved surface contacting said support structure.

2. The clip-on nut of claim 1 wherein an aperature is formed in said protrusion, the aperature in said protrusion being in alignment with the aperature in said first leg member.

3. The clip-on nut of claim 1 wherein a third leg member is attached to the end of said first leg member and extends towards the curved end portion of said metal member, said third leg member having an opening in alignment with the aperatures in said first and second leg members.

4. The clip-on nut of claim 3 further including a nut supported by said third leg member for retaining a bolt.

5. The clip-on nut of claim 1 wherein said protrusion is diametrical with the diameter having a radius.

* * * * *